United States Patent
Menon et al.

(10) Patent No.: US 6,868,143 B1
(45) Date of Patent: Mar. 15, 2005

(54) SYSTEM AND METHOD FOR ADVANCED UNIFIED MESSAGING

(75) Inventors: Jai Menon, Alpharetta, GA (US); Marlon Osbourne, Atlanta, GA (US); Hitesh Shah, Norcross, GA (US); Donna K. Hodges, Cumming, GA (US)

(73) Assignee: BellSouth Intellectual Property, Wilmington, DE (US)

( * ) Notice: Subject to any disclaimer, the term of this patent is extended or adjusted under 35 U.S.C. 154(b) by 0 days.

(21) Appl. No.: 10/261,490

(22) Filed: Oct. 1, 2002

(51) Int. Cl.⁷ ................................................ H04M 1/64
(52) U.S. Cl. ..................... 379/88.13; 379/67.1; 379/70; 379/88.12; 379/88.17; 379/88.18
(58) Field of Search .......................... 379/67.1, 68, 69, 379/70, 88.04, 88.12, 88.13, 88.17, 88.18, 88.22, 88.25

(56) References Cited

U.S. PATENT DOCUMENTS

| | | | |
|---|---|---|---|
| 5,493,609 A | | 2/1996 | Winseck, Jr. et al. |
| 5,608,786 A | * | 3/1997 | Gordon ...................... 379/100 |
| 5,675,507 A | * | 10/1997 | Bobo, II ................. 364/514 R |
| 5,742,905 A | * | 4/1998 | Pepe et al. .................. 455/461 |
| 5,822,405 A | * | 10/1998 | Astarabadi .................... 379/88 |
| 5,872,926 A | * | 2/1999 | Levac et al. ............ 395/200.36 |
| 6,233,317 B1 | * | 5/2001 | Homan et al. ........... 379/88.05 |
| 6,233,318 B1 | * | 5/2001 | Picard et al. ............. 379/88.17 |
| 6,438,217 B1 | | 8/2002 | Huna |
| 6,463,462 B1 | * | 10/2002 | Smith et al. ................. 709/206 |
| 6,560,318 B1 | * | 5/2003 | Spielman et al. ......... 379/88.12 |
| 6,570,964 B1 | * | 5/2003 | Murveit et al. ............ 379/67.1 |

OTHER PUBLICATIONS

"The Benefits of Unified Messaging," UnifiedMessaging.com, pp. 1–3.
"Take a Message," Software Reviews CNET.com, pp. 1–2.
"Cisco Unity—Unified Messaging and Voice Mail," www.cisco.com, Cisco Product Catalog, Aug. 2002, pp. 1–4.

* cited by examiner

Primary Examiner—Allan Hoosain
(74) Attorney, Agent, or Firm—Merchant & Gould

(57) ABSTRACT

Systems and methods for providing advanced unified messaging are described. The subscriber specifies preferences based on message type, access device type, the subscriber's schedule, and other information. A message server utilizes this information to extract keywords and develop abstracts of particular messages. Subsequently, when the subscriber requests access to a message, the message server has the capability of tailoring delivery of messages to the subscriber on a specific access device.

19 Claims, 5 Drawing Sheets

SYSTEM AND METHOD FOR ADVANCED UNIFIED MESSAGING

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

FIELD OF THE INVENTION

The present invention generally relates to providing messaging services. The present invention more particularly relates to providing unified messaging services to heterogeneous access devices.

BACKGROUND

Telecommunications service subscribers have grown dependant on messaging systems. Often, subscribers have email, text, and voice messaging systems, as well as a separate fax number. Requiring a subscriber to maintain this collection of messaging services is at least inefficient and can lead to confusion on the part of the subscriber and on the part of parties attempting to contact the subscriber.

In an attempt to provide a more efficient approach, service providers and messaging system developers have created unified massaging systems. Conventional unified messaging systems provide a single data store for storing voicemail, email, short messaging service (SMS), and other messages, as well as faxes. The messaging system includes one or more converters that convert the message into some common format when the message is received so that the message can be placed in the subscriber's "inbox." The subscriber accesses the inbox to "read" the message. While conventional unified messaging solutions do provide a single interface that combines the subscribers various messaging services, the conventional solutions suffer from several limitations.

One limitation of conventional unified messaging systems is a lack of flexibility. In conventional systems, the subscriber must either access the system through a single interface, such as a computer-based graphical user interface, or the subscriber must perform a configuration process during which the subscriber chooses a delivery mechanism by which the message is routed. For example, in the U.S. Pat. No. 6,438,217 to Emmanuel L. Huna (hereinafter "Huna"), a user specifies a delivery time in the future and a method by which the system delivers messages received by the user's email or voicemail messaging service. The user must specify the future time and the type of device to which the messages are forwarded. The approach provides very limited flexibility to the subscriber.

Other conventional unified messaging systems allow the user to access the systems via multiple types of devices, but the systems convert the format of the message based only on the type of address accessing the messaging platform. For example, if a user requests the message from a phone, the system converts the message to analog audio. If the requesting device has an Internet Protocol (EP) address, the system converts the message to text or some other digital format. See, e.g., U.S. Pat. No. 6,233,218 to Donald F. Picard, et al.

These conventional systems suffer from additional limitations. For example, conventional systems convert an entire message, or at least the portions they are able to convert, and forward the entire message to the user. While this approach may be acceptable if the user accesses the service via a fully multimedia-capable personal computer (PC), the conventional approach is problematic when the user accesses the service using a cell phone, web-capable cell phone, personal digital assistant, and the like.

SUMMARY

The present invention provides systems and methods for providing advanced unified messaging. An embodiment of the present invention includes a message server that includes a processor for executing software. The message server also includes an extractor for extracting keywords and other information from messages, and a data store for storing a subscriber profile and messages.

In order to provide messages to subscribers in varying formats, one embodiment includes data converters. These data converters perform voice-to-text, text-to-voice, and other data conversions as necessary to satisfy subscriber requests. The message server may be a single server, a server farm, a cluster of networked computers, or a grid.

An embodiment of the present invention also includes a user interface for accessing previously recorded messages. The user interface may include a web site, a voice-enabled interface, some other type of interface, or a combination of several types of interfaces.

In an embodiment of the present invention, a database stores a subscriber profile. The subscriber profile may include subscriber preferences. Subscriber preferences include such information as a device registry, a calendar, a keyword repository, and a folder structure. A system according to the present invention may use this information to create abstracts of messages. The database may also store the messages. Alternatively, the message store may reside on a separate computer or group of computers.

An embodiment of the present invention also includes a message delivery component. The message delivery component takes the information from the extractor and creates a message to be delivered to the subscriber. The delivery component then utilizes a proper means to transmit the resulting message.

In a method according to the present invention, the message server receives a message directed to a subscriber. In response, the message server searches a database for a subscriber profile that includes the subscriber's preferences. The message server utilizes these preferences to extract keywords from the message. The message server then stores the message and keywords in one or more data stores.

Subsequently, the subscriber uses a telephone, PDA, PC, or other device to request access to the messages in the data store. The message server receives this request, identifies the subscriber, and determines what format type should be used to deliver each message based on attributes of the request, e.g., the type of device the subscriber is using, and based on information in the subscriber profile. The message server then converts and formats the message and sends it to the subscriber.

The message may be an email message, a voicemail message, a facsimile, a short messaging service message, an enhanced messaging service message, a multimedia messaging service message, or some other type of message. The message may be created on and retrieved from any of a number of devices including, but not limited to, a wireline telephone, a wireless telephone, a personal digital assistant, a personal computer, and a web appliance.

When the message server receives the message, the message server parses the message for occurrences of keywords stored in the subscriber's profile. Depending on the preferences of the user, the message server may perform additional steps as well to determine the meaning of and the general topic addressed by the message.

When the message server receives a request from the subscriber to access the message, the message server identifies the user, for example, by validating a username and password combination. The message server then identifies the type of access device the subscriber is using. For example, the message server may compare caller identifier (ID) information to a device registry, previously completed by the subscriber. Based on the device, the message, and the subscriber's preferences, the message server creates a text, multipurpose, Internet mail extension, short messaging service, moving pictures expert group, or wave-formatted messages and delivers it to the subscriber's device. Delivering it to the subscriber's access device may include steps such as converting the message to the desired format, creating an electronic envelope for the message, and ending the message and envelope to the subscriber over the appropriate communications conduit.

An embodiment of the present invention provides numerous advantages over conventional unified messaging systems and methods. An embodiment of the present invention virtualizes both the network and the presentation. An embodiment supports multiple message and device types and offers the subscriber the ability to specify the presentation of the message based on the subscriber's profile, preferences, and presence. An embodiment of the present invention not only converts messages and attachments; an embodiment provides the capability of providing keywords and abstracts of a message to the subscriber in lieu of sending an entire message, resulting in a more efficient and effective unified messaging system.

Further details and advantages of the present invention are set forth below.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Embodiments of the present invention provide systems and methods for advanced unified messaging. In an embodiment of the present invention, a messaging server utilizes a subscriber's preferences to determine how to deliver voice, email, and other messages to the subscriber on the subscriber's access device. Both the format and the content of what the server delivers vary based on the subscriber's preferences, the type and content of the message, and on the capabilities of the subscriber's access device. An embodiment of the present invention provides the subscriber with a generic, ubiquitous user interface and is able to deliver more than just the original message in a new format; an embodiment of the present invention is also able to deliver the semantic characteristics of the message.

Figure 1:
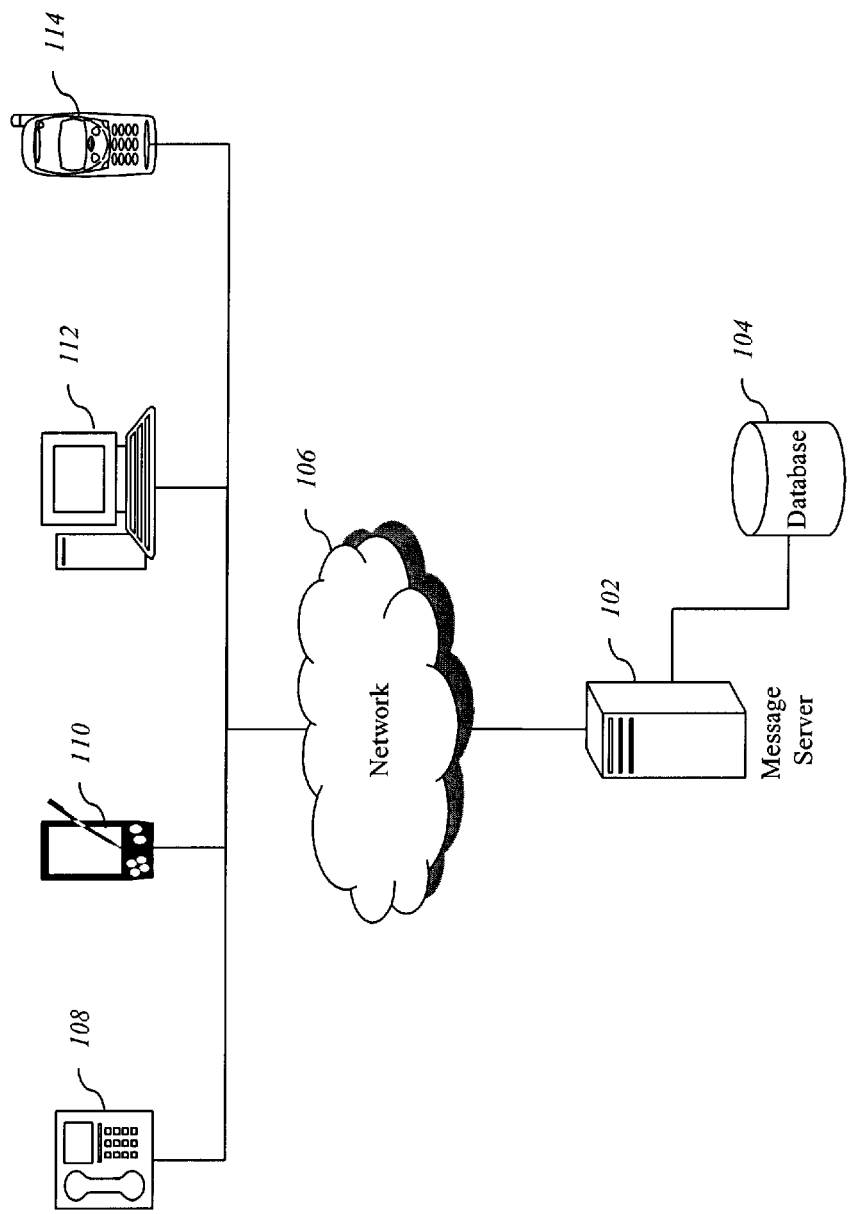
FIG. 1 illustrates an exemplary environment for providing an advanced unified messaging service in an embodiment of the present invention.

Referring now to the drawings, in which like numerals indicate like elements throughout the several Figures, FIG. 1 illustrates an exemplary environment for providing an advanced unified messaging service in an embodiment of the present invention. In the embodiment shown, a message server 102 is in communication with a database 104. The messaging server 102 may be a general or special-purpose computer. The computer utilizes a processor, executing an operating system, such as a Unix, Linux, Windows, Macintosh, or other operating system. The messaging server 102 also utilizes applications software for receiving, storing, processing, and delivering messages. In other embodiments, the message server 102 may include multiple computers in communication with one another, such as a server farm, cluster, or grid. In any case, the message server operates transparently to the subscriber in a manner similar to the service provided by a conventional, voice-grade telecommunications service. The subscriber simply sets up the service and then utilizes whatever device is convenient to retrieve messages from the message server 102.

The database 104 also consists of hardware and software. Like the message server 102, the database 104 may be a general or special purpose computer or may be software executing on the message server. The database 104 may also include a storage network consisting of multiple computers executing as a grid or cluster. The database management software may be a proprietary database format or any of a number of commercially available database products, such as Oracle or Microsoft SQL Server.

The message server 102 is in communication with a network 106. The network includes a governmental, private, or public network that provides a communications conduit between the message server 106 and access devices 108–114. For example, in one embodiment, the network 106 includes the Internet. In another embodiment, the network includes an intranet. In yet another embodiment, the network includes a telecommunications service provider's network. In other embodiments, various networks are combined to provide the conduit between the message server 106 and the access devices 108–114.

In an embodiment of the present invention, a subscriber or a person leaving a message for a subscriber accesses the message server through an access device. In the embodiment shown in FIG. 1, the access device is a telephone 108, a personal digital assistant (PDA) 110, a personal computer (PC) 112, or a cell phone 114. Various other access devices, such as BlackBerry handheld messaging devices and Internet appliances, may also be used to leave and to retrieve messages.

Figure 2:
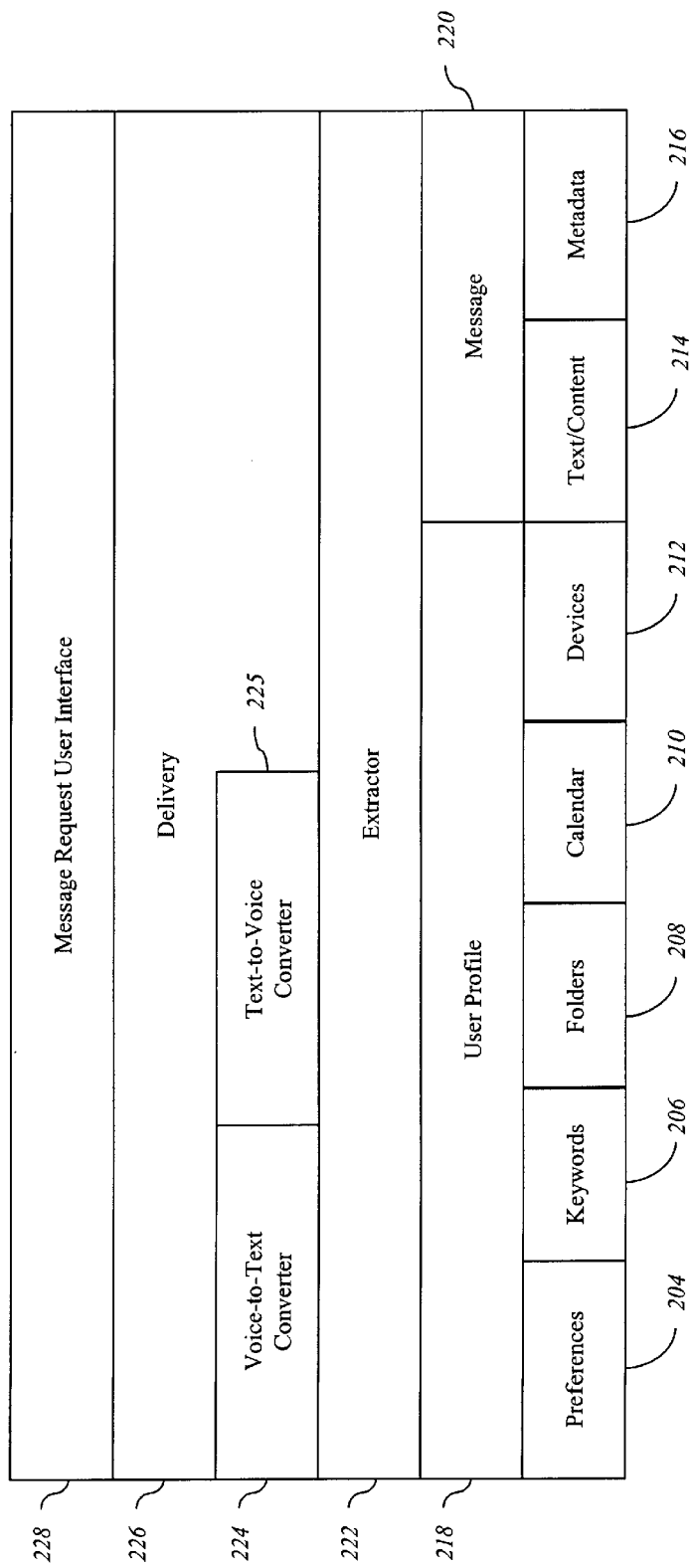
FIG. 2 is a block diagram illustrating the layers of logical components utilized by one embodiment of the present invention.

In an embodiment of the present invention, various logical components interact to provide advanced unified messaging services. FIG. 2 is a block diagram illustrating the layers of logical components utilized by on e embodiment of the present invention. The lowest layer, which include s components 204–216, includes components to access data included in a data store, such as the database (104). This layer includes the following components: preferences 204, keywords 206, folders 208, calendar 210, devices 212, text/content 214, and metadata 216 component. Each of these components is designed to extract data from a data store and provide it to the component above (in the Figure) in a format that the upper-layer component can interpret. For example, each of these components may be an ActiveX or Enterprise Java Beans (EJB) component executing in an execution environment such as Component Object Model+ (COM+) or Java 2 Platform, Enterprise Edition (J2EE). These components may execute in a distributed or non-distributed environment, including on a single server, a server farm, a cluster, or in a grid. Although the components are shown as providing information for the delivery of messages in FIG. 2, the components may also include code to validate, store, and otherwise process the data about the subscriber and messages. For example, a subscriber interface (not shown) may access the preferences component 204 in order to add, modify, delete, or otherwise maintain the subscriber preferences stored in the database 104.

The preferences component 204 extracts information that the subscriber specifies as preferences, such as the formats the subscriber prefers for various types of message data. The keywords component 206 extracts the keywords that the subscriber has previously specified or which the system has created based on the subscriber's previous actions and messages. The folders component 208 extracts information regarding the way in which the subscriber has organized their electronic messaging system. Various methods may be utilized in an embodiment of the present invention to generate keywords for a particular message. The embodiment shown uses the folder structure of the subscriber as one source of information for generating keywords. The calendar component 210 extracts information from a calendar that the subscriber stores. For example, the subscriber may provide entries that specify where high priority messages are to be delivered on days when the subscriber is traveling. For example, the subscriber may specify that the system send abstracts of messages to a PDA (110) while the subscriber is traveling.

The lower-layer components also include a device component 212. In one embodiment, the device component 212 accesses a device registry, which contains information for all of the devices that the subscriber has registered in the system. In another embodiment, the device component 212 utilizes standardized rules for presenting information to various types of access devices.

The lower-layer components also include two components related to the messages that the subscriber receives, the text/content component 214 and the metadata component 216. These components retrieve information from the message data store about the message. For example, the metadata component 216 extracts name/value pairs from the header portion of the message. The message data store may reside in the database (104).

The lower-layer components 204–216 provide information to the upper-layer components, the subscriber profile 218 and message 220 components. The lower-layer components may be stored procedures or may be object-oriented components as described above. If they are object-oriented components, the upper-layer components utilize the lower-layer components by creating an instance of a lower-layer component and then accessing the properties and methods exposed by the lower-layer components. For example, the subscriber profile component 218 creates an instance of the preference component 204. The subscriber profile component 218 then calls a method of the preferences component 204, for example, getAudioFormat. The getAudioFormat method takes as input a subscriber identifier, such as a subscriber's telephone number. The getAudioFormat method uses the subscriber identifier to search a table in the database (104) for information related to the subscriber. Contained in the table is a value, such as .wav. The getAudioFormat method retrieves this value and passes it back to the subscriber profile component 218. The subscriber profile component, in turn, passes this information to a component in the next layer, the extractor component 222.

The extractor component 222 utilizes information provided by the subscriber profile component 218 and the message component 220 to extract information for creating a delivery to the subscriber. For example, the subscriber requests a message using a phone, and the message data store includes one message for the subscriber that contains 1000 characters. The subscriber profile component 218 provides information from the subscriber preferences component 204 indicating that the subscriber prefers only an abstract of messages greater than 400 characters when the subscriber is making the request via phone. The extractor component 222 utilizes this information in concert with the actual contents and metadata of the message provided by the message component 220 to extract information necessary to create an abstract of the message. In contrast, if the subscriber requests a message from a fully multimedia-capable PC, the extractor simply extracts the entire message for delivery to the subscriber.

The extractor component 222 provides the message or message abstract to the voice-to-text converter component 224, the text-to-voice converter component 225, or the delivery component 226. In one embodiment of the present invention, the message server (102) stores the messages in their native format. The voice-to-text 224 and text-to-voice 225 converter components convert the message or message abstract provided by the extractor component 202 to the format specified by the subscriber based on the attributes of the message and of the access device. In the example above, the extractor component 222 provides an abstract of the message to the text-to-voice converter component 225 as text, and the text-to-voice converter component 225 converts the text into a wave (.wav) file containing the text converted to speech. If no conversion is necessary, the extractor component 222 may provide the message in its native format to the delivery component 226.

In the embodiment shown, the delivery component 226 receives information from at least one of the voice-to-text converter 224, text-to-voice converter 225, and extractor 222 components. The delivery component 226 constructs a message that is compatible with the subscriber's current access device and delivers the message. For example, if the subscriber requests a message from a PC (112), the extractor 222 provides the delivery component with the entire message in text, and the delivery component 226 creates a multipurpose Internet mail extensions (MIME) message and delivers the message to the subscriber interface component 228. Based on the subscriber's preferences and the type and content of the message, the delivery component 226 may create multiple messages in multiple formats and deliver the messages using multiple corresponding transmission conduits. The delivery component 226 may include an expert system for determining how and where to deliver a message or messages to a subscriber.

The delivery component 226 is shown as a single component in the figure, but in a physical embodiment, the delivery component 226 includes a variety of hardware and software components, including the elements of network 106. However, the subscriber is shielded from the complexity of the implementation. In many instances, conventional tools provide insulation to a developer of an embodiment of the present invention who utilizes standard protocols, such as Internet protocols, in developing and implementing the delivery component. For example, many commercial components exist that allow a developer to incorporate Internet mail functionality into a custom application.

Figure 3:
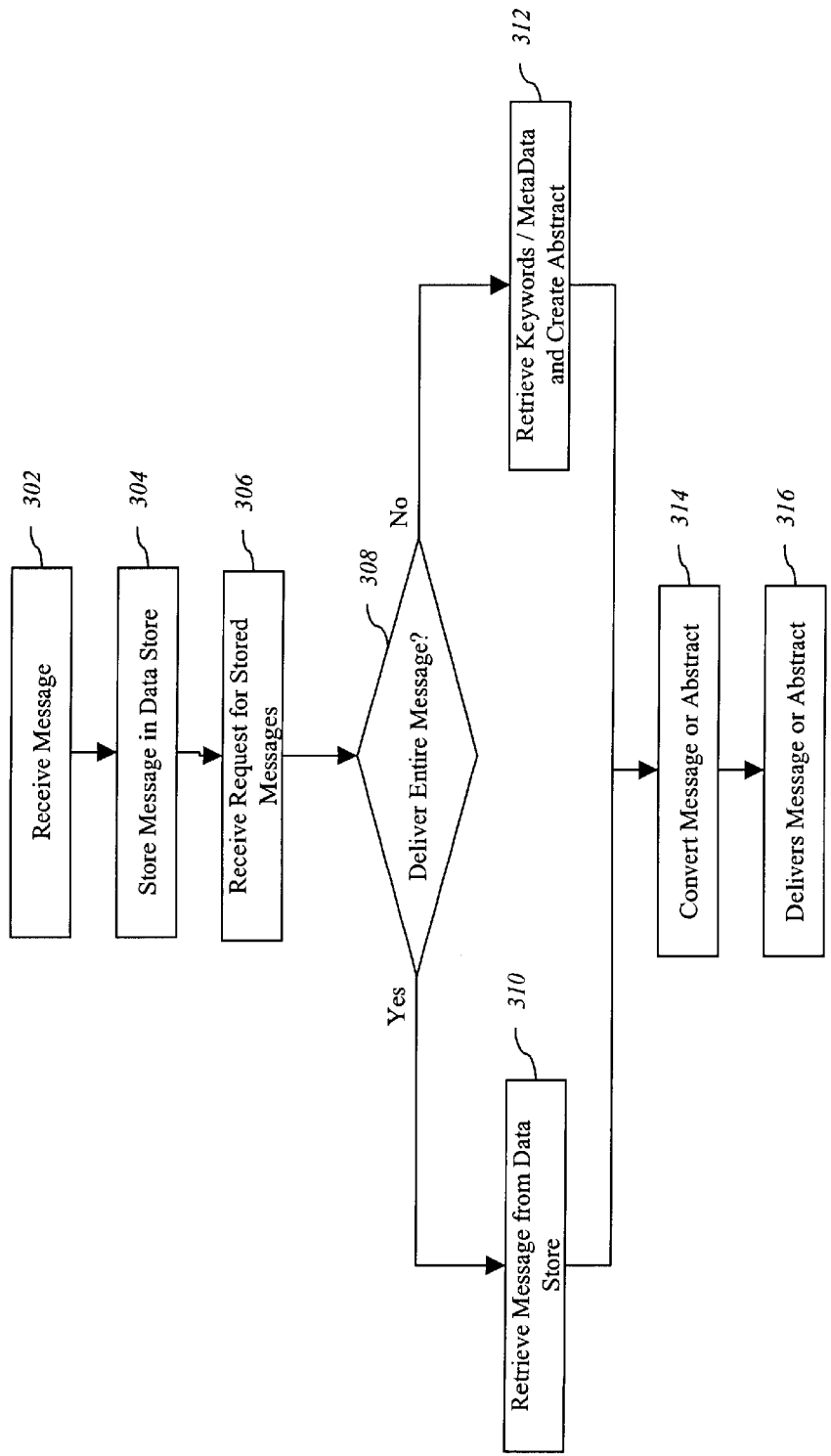
FIG. 3 is a flow chart, illustrating the general process of receiving and delivering a message in one embodiment of the present invention.
Figure 4:
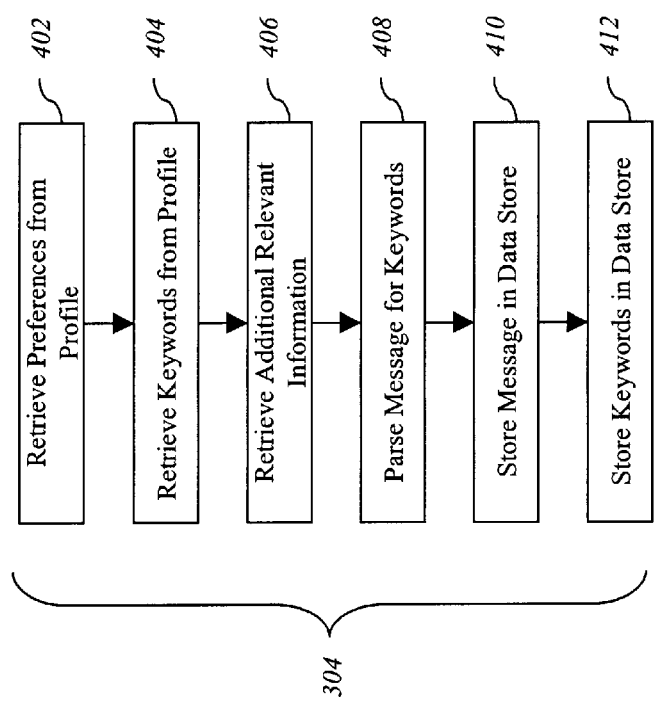
FIG. 4 is a flow chart, illustrating the process of storing a message in one embodiment of the present invention.
Figure 5:
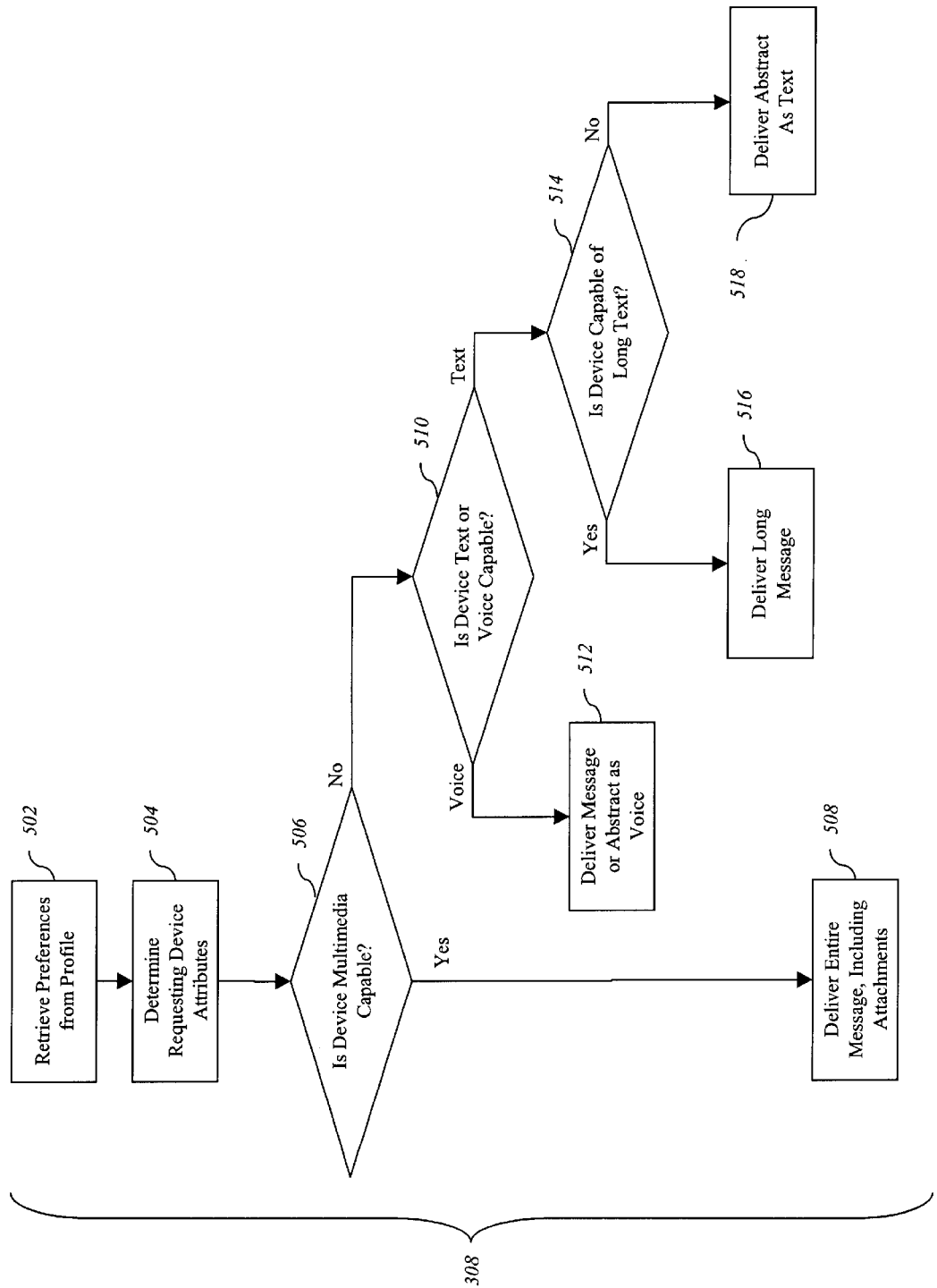
FIG. 5 is a flow chart, illustrating the process of determining in what format to send a message in one embodiment of the present invention.

A variety of processes occur in an embodiment of the present invention. FIG. 3 is a flow chart, illustrating the general process of receiving and delivering a message in one embodiment of the present invention. FIGS. 4 and 5 provide additional detail regarding specific steps in the process shown in FIG. 3.

The first step shown in FIG. 3 occurs when the message server (102) receives a message form the network (106) 302. The message may emanate from a variety of sources, including an application executing on one of the access devices (108–114) shown in FIG. 1. The message server (102) then stores the message in the data store (104) 304. In one embodiment, the message server (102) stores the message in its native format. However, in some embodiments, it may be necessary to perform at least some type of conversion on an incoming message. For example, if the data store only supports digital formats, such as is the case with many electronic databases, the message store includes digital conversion software and/or hardware that creates a digital file containing the analog voice message. The digital file may be a standard format used across subscribers; it may be a format specified by individual subscribers; or it may be a format determined by the source of the message and the quality of reproduction required.

Referring again to FIG. 3, the message server (102) subsequently receives a request for stored messages from the subscriber 306. The subscriber may use various means to issue the request. For example, in one embodiment, the user accesses a client application executing on a personal computer. The client application communicates with the message server to obtain a list of messages stored on the message server. The client application presents this to the user. The user selects a message from the list and indicates that the application should open the message. In response, the application sends a second request to the message server requesting the particular message.

In response, the message server (102) utilizes stored subscriber preferences to determine whether to deliver an entire stored message or an abstract of the message 306. If the message server (102) is delivering a whole message, it retrieves the message from the data store (104) 310. The decision of what type of message to deliver is based on the capabilities of the subscriber's access device as well as the preferences that the subscriber has previously entered. The specific decision points in this process are described in further detail in relation to FIG. 5.

If the message server (102) is not delivering the entire message, it retrieves keywords, metadata, or other content and information from and about the message and creates the abstract 312. For example, if one embodiment the subscriber has specified the following keywords: "car," "boat," "airplane," and "music." The message server (102) opens the message and first performs a text search of the message header for the keywords. Text searching can be performed with many commercially-available software components. If any of these keywords are found, the message server (102) associates the keyword found with the message. The message server performs a similar text search of the body of the message. Based on the number of times a particular word is found in the message, the message server prepares the abstract. For example, if the word "car" appears in a message from John Smith 20 times, and the subject line contains "Transmission Problems," the message server (102) creates an abstract stating that the message is about "Transmission Problems relating to cars."

Once the message or abstract is created, the message server (102) converts the message or abstract to the proper format for delivery to the access device the subscriber is using to issue the request 314. For example, if the message is a text message being delivered to a phone, the message server (102) converts the text to voice and streams the audio to the source of the request for the message. As was described in relation to FIG. 2, the message server (102) may not need to convert the message if the access device and message's native format are compatible. For example, the multimedia-capable PC can accept substantially all of the formats stored on the message server. Once the message has been converted (or not), the message server (102) delivers the message 316. Delivering the message may include creating an audio stream, transmitting a MIME message, or some other action that causes a digital transmission to the requesting device or to a device specified by the subscriber in the subscriber's preferences or otherwise.

FIG. 4 is a flow chart, illustrating one embodiment of step 304 in FIG. 3, the step of storing a message in the data store. In the embodiment shown, the message server (102) utilizes the subscriber profile component (218) to retrieve the preferences of the subscriber to which the message is directed from the subscriber profile in the database (104) 402. The message server (102) also uses the subscriber profile component (218) to retrieve the keywords that the subscriber has specified 404. For example, in one embodiment, the subscriber profile component (218) includes a getKeywords method. The getKeywords method accepts a user identifier and returns a list of keywords in comma separated value (CSV) format. The component includes code to open a connection to the database (104), execute a query, and format the results to be passed back to the calling component.

In addition, in the embodiment shown, the message server (102) retrieves additional relevant information 406. This additional information may include anything from the subscriber's folders or calendars to the maximum amount of space the subscriber may use on the database (104). What information is relevant is dependant on the particular implementation of an embodiment of the present invention.

Using the preferences, keywords, and other relevant information, the message server (102) parses the message for keywords 408. Generally, in conventional computer systems, metadata is automatically generated and included in a header of a message. However, if metadata is not present in the header of a message, an embodiment of the present invention may also generate metadata based on various attributes of the message. The message server (102) then stores the message in the data store (104) 410. The message server (102) also stores the keywords in the data store (104) 412. As described above, the data store (104) may include multiple databases and other storage facilities in various embodiments of this invention. For example, it may be more efficient to store certain types of messages in certain types of databases to most efficiently utilize resources or to enhance the responsiveness of the system.

Also, although the embodiment shown in FIG. 4 parses the message for keywords when the message is received, various other embodiments may utilize other methods. For example, in one embodiment, the message server (102) parses the message only when creating an abstract. In another embodiment, a batch job runs periodically that extracts keywords from all messages not previously processed. In such an embodiment, messages that have not been processed when a subscriber requests the message may have to be processed immediately to satisfy the subscriber's request. However, the efficiency gained by not running the parsing process every time a message is received or sent may outweigh the inconvenience of maintaining both a batch and an on-demand version of the parser.

FIG. 5 is a flow chart, illustrating one embodiment of step 308 in FIG. 3, the process of determining in what format to send a message. As in the process illustrated by FIG. 4, the message server (102) first retrieves preferences from the subscriber profile 502. The message server (102) also determines the attributes of the requesting device 504. The message server (102) may determine the attributes of the requesting device in several ways. For example, if the request is a hypertext transfer protocol (HTTP) request, the message server (102) examines the user agent string. The user agent string identifies the IP address of the device submitting the request and also identifies aspects of the user interface, such as the type and version of browser software used to issue the request. The message server (102) uses at least some of this information to determine how a response to the request should be formatted. In another example, the message server (102) ascertains the caller identifier (ID) of the user by utilizing software commonly available for use in telephone handsets and caller ID boxes. The message server (102) creates an instance of the device component (212) and calls a method for retrieving device attributes, passing the device identifier. The device component (212) executes a query against the database (104) in which the device registry is stored. The database returns various attributes, such as screen size, multi-media capability, and transfer rates, which the method returns to the message server (102). The message server (102) uses this information to determine how to format the reply.

Based on these attributes, the message server (102) determines whether the access device is multimedia capable 506. For example, if the access device is the subscriber's computer, PC (112) in FIG. 1, the subscriber's preferences include an entry that identifies the PC (112) as a multimedia-capable device. Based on this information, the message server (102) delivers the entire message to the subscriber's PC (112) 508. Delivering a message to the to the subscriber's access device may include additional steps such as converting the message to the desired format, creating an electronic envelope for the message, and sending the message and envelope to the subscriber over the appropriate communications conduit.

If the device is not multimedia capable, the message server (102) determines whether the device includes voice or text capabilities 510. As described above, the message server (102) may utilize the user agent string or a device identifier along with information in the device registry to make this determination. If the device is voice capable, the message server (102) delivers the message or abstract as voice 512. As is described above, if the native format of the message is not audio, a text-to-voice converter component 225 converts the message to a format suitable for delivery to a voice-capable device. If the device is not voice capable, the message server (102) determines whether the device or the subscriber's preferences place a limit on the length of a message directed to the device 514.

If the device is capable of receiving a long message and the subscriber's preferences dictate sending a long message to the device, the message server (102) delivers a long message 516. As with the other forms of messages described herein, the message server (102) may perform a conversion before delivering the message. If the device is incapable of receiving a long message, or the subscriber indicates that the device should not receive long messages, the message server (102) delivers the abstract to the device 518. For example, the message server (102) may utilize a short messaging service (SMS) or enhanced messaging service (EMS) message format to send information to a PDA (110).

An embodiment of the present invention may include a variety of administrative functions. For example, in one embodiment, a web-based subscriber interface provides a mechanism for the subscriber to enter preferences, keywords, calendar entries, device information, and organize messages into a folder structure. Another embodiment provides a suite of tools to allow a service provider to add, remove, and/or modify the services available on the message server and other components used to implement an embodiment.

The administrative tools available to the service provider may also include tools for billing subscribers or other service providers for use of an advanced unified messaging system according to the present invention. In one embodiment, a usage tracker determines the number of messages and/or the utilization of resources by subscriber and provides a mechanism for creating billing records based on this utilization. In such an embodiment, the message server (102) stores an entry in the database (104) each time a message is received. The entry includes the identity of the subscriber and attributes of the message, such as date received, size, and type. A billing computer (not shown) accesses the database periodically, such as monthly, and determines a charge for the subscriber based on the volume of messages processed during a specified time period. For example, if a subscriber receives 1000 that average 100 kilobytes each during a month, the subscriber may be charged an amount for the volume and for the space required to store the messages. The billing computer may aggregate information for all of the subscribers in order to bill a third-party provider for providing the service to the third-party provider's subscribers.

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A method for providing unified messaging, comprising:
receiving a message directed to a subscriber;
retrieving a keyword specified by said subscriber from a subscriber profile;
searching said message for said keyword;
if said keyword is found a certain number of times, then extracting said keyword from said message;
storing said message and said keyword in a data store; and
preparing an abstract of said message based on content of said message and said keyword specified by said subscriber.

2. The method of claim 1, further comprising:
receiving a request to access said data store from said subscriber through an access device;
identifying said subscriber;
determining a format type corresponding to an attribute of said request by searching said subscriber profile; and
delivering said message in said format to said subscriber.

3. The method of claim 2, wherein said access device comprises a device selected from the group consisting of a wireline telephone, a wireless telephone, a personal digital assistant, a personal computer, and a web appliance.

4. The method of claim 2, wherein said identifying comprises validating a username and password combination.

5. The method of claim 2, wherein said identifying comprises comparing a device identifier to an identifier in a device registry.

6. The method of claim 2, said format comprises a format selected from the group consisting of text, multipurpose Internet mail extension, short messaging service, moving pictures expert group, and wave.

7. The method of claim 2, wherein delivering said message comprises:

converting said message to said format;

creating an electronic envelope for said message; and sending said message and said electronic envelope to said subscriber.

8. The method of claim 1, wherein said message comprises a message selected from the group consisting of an email message, a voicemail message, a facsimile, a short messaging service message, an enhanced messaging service message, and a multimedia messaging service message.

9. The method of claim 1, wherein said extracting comprises parsing said message for an occurrence of said keyword.

10. The method of claim 1, wherein said storing comprises storing said message in a database.

11. A system for providing unified messaging, comprising:

a processor operative to:
 receive a message directed to a subscriber;
 retrieve a keyword specified by said subscriber from a subscriber profile;
 search said message for said keyword a certain number of times; and
 prepare an abstract from said message based on content of said message and said keyword specified by said subscriber;

an extractor executing on said processor; and a data store comprising:
 the subscriber profile, and
 a message store.

12. The system of claim 11, further comprising:

a voice-to-text converter; and a text-to-voice converter.

13. The system of claim 11, further comprising a user interface.

14. The system of claim 13, wherein said user interface comprises a web site.

15. The system of claim 13, wherein said user interface comprises a voice-enabled user interface.

16. The system of claim 11, wherein said subscriber profile comprises a subscriber preference database.

17. The system of claim 16, wherein said subscriber preference database comprises at least one of a device registry; a calendar; a keyword repository; and a folder structure.

18. A computer-readable medium on which is encoded computer program code for providing unified messaging, comprising:

computer program code for receiving a message directed to a subscriber;

computer program code for retrieving a keyword specified by said subscriber from a subscriber profile;

computer program code for searching said message for said keyword a certain number of times;

computer program code for extracting a keyword from said message if said keyword is found in said message;

computer program code for storing said message and said keyword in a data store; and computer program code for preparing an abstract of said message based on content of said message and said keyword specified by said subscriber.

19. The computer-readable medium of claim 18, further comprising:

program code for receiving a request to access said data store from said subscriber;

program code for identifying said subscriber;

program code for determining a format type corresponding to an attribute of said request by searching said subscriber profile; and program code for delivering said message in said format to said subscriber.

* * * * *